United States Patent [19]
Nakane et al.

[11] 4,314,972
[45] Feb. 9, 1982

[54] MULTI-STAGE HYDROGEN WATER ISOTOPIC EXCHANGE COLUMN

[75] Inventors: Ryohei Nakane; Shohei Isomura; Masami Shimizu, all of Tokyo, Japan

[73] Assignees: Rikagaku Kenkyusho, Saitama; Doryokuro Kakunenryo Kaihatsu Jigyodan, Tokyo, both of Japan

[21] Appl. No.: 207,466

[22] Filed: Nov. 17, 1980

Related U.S. Application Data

[63] Continuation of Ser. No. 76,945, Sep. 19, 1979, abandoned.

[30] Foreign Application Priority Data

Sep. 27, 1978 [JP] Japan .................. 53/118815

[51] Int. Cl.³ .............................................. B01J 8/04
[52] U.S. Cl. ..................................... 422/191; 261/98; 261/114 A; 422/195; 422/220
[58] Field of Search ............... 422/190, 191, 192, 195, 422/212, 213, 216, 220, 224; 261/96–98, 114 A, DIG. 72

[56] References Cited

U.S. PATENT DOCUMENTS

| | | | |
|---|---|---|---|
| 3,290,024 | 12/1966 | Huber | 261/97 X |
| 3,598,542 | 8/1971 | Carson et al. | 261/97 X |
| 3,972,966 | 8/1976 | Lund et al. | 261/114 A X |
| 4,140,625 | 2/1979 | Jensen | 261/96 X |

Primary Examiner—William A. Cuchlinski, Jr.
Attorney, Agent, or Firm—Kerkam, Stowell, Kondracki & Clarke

[57] ABSTRACT

Disclosed is a multi-stage hydrogen water isotopic exchange column suitable for use in producing heavy water. It comprises, at each stage, an overlying vapor-and-water contact bed, an underlying catalyst bed and means for collecting the water dripping from the overlying contact bed and guiding to and sprinkling the water on the upper-surface of the vapor-and-water contact bed of the lower adjacent stage.

The vapor-and-water contact bed consists of a closely compacted fine network structure, and the water dripping from an overlying contact bed is transferred through the catalyst bed via water channel and is sprinkled over the upper-surface of the vapor-and-water contact bed of the lower adjacent stage. With this arrangement a multi-stage exchange column according to this invention is guaranteed little amount of gas pressure loss and elimination of water splashing which otherwise would be caused by increasing the flow rate of hydrogen gas.

4 Claims, 3 Drawing Figures

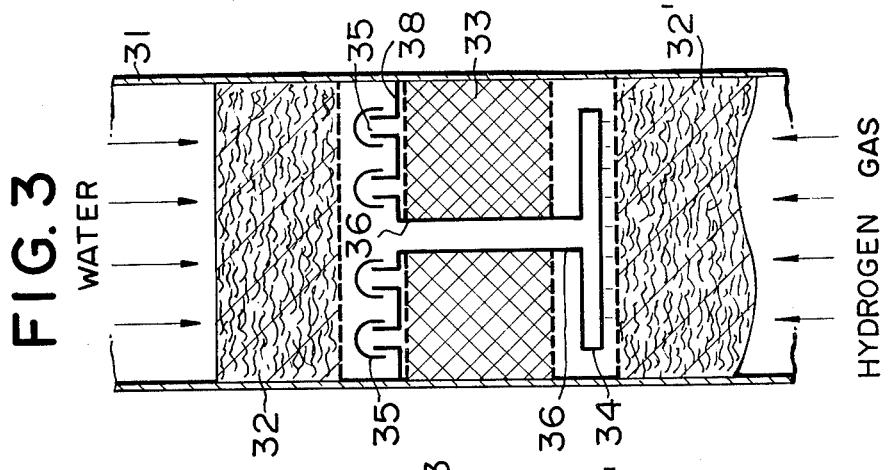
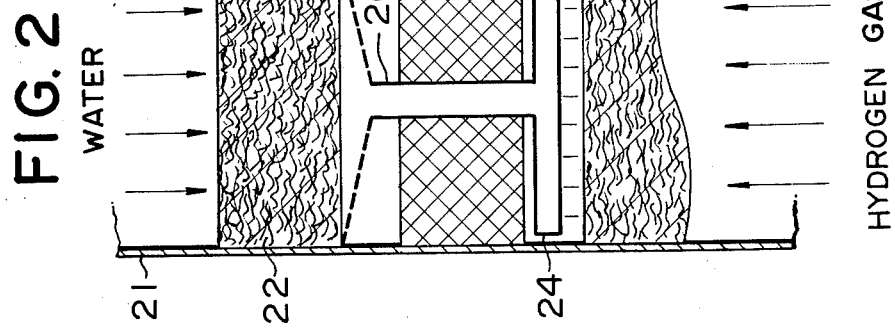
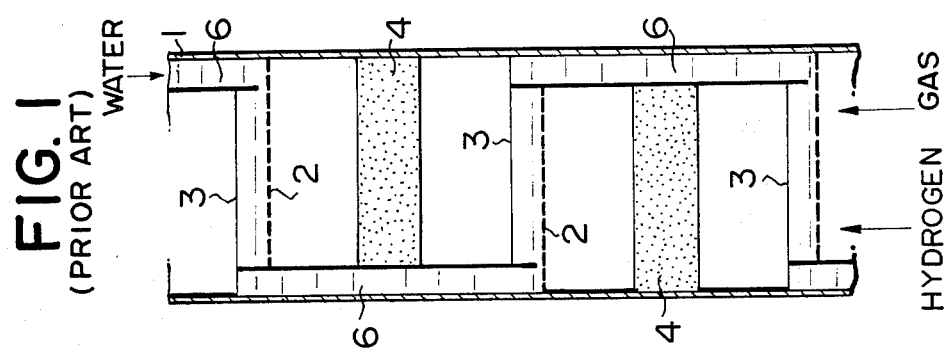

MULTI-STAGE HYDROGEN WATER ISOTOPIC EXCHANGE COLUMN

This application is a continuation, of application Ser. No. 076,945, filed Sept. 19, 1979 now abandoned.

This invention relates to hydrogen isotope enrichment facilities using a hydrophobic catalyst for expediting hydrogen-water vapor isotopic exchange. More specifically it relates to a multi-stage hydrogen water isotopic exchange column particularly suitable for use in heavy water production.

In the accompanying drawings

FIG. 1 shows in vertical section a prior art structure for a multi-stage exchange column;

FIG. 2 shows in vertical section a first embodiment of the present invention; and FIG. 3 shows in vertical section a second embodiment of the present invention.

A multi-stage hydrogen-water isotopic exchange column for use in heavy water production which has been hitherto proposed, comprises a plurality of hydrophobic catalyst shelves for expediting hydrogen-vapor isotopic exchange, and a plurality of vapor-and-water contact shelves, essentially composed of a transverse layer of water flow, said catalyst shelves and vapor-and-water contact shelves being arranged alternately with each other and said vapor-and-water contact shelves being communicated to each other by longitudinal channels. Referring to FIG. 1, there is shown a conventional multi-stage isotopic exchange column as mentioned above. The tower 1 has a plurality of stages each consisting of a vapor-and-water contact shelf 3 and a hydrophobic catalyst shelf 4. The contact shelf 3 has a perforated plate, on which the descending water flows in the transverse direction. The hydrophobic catalyst bed 4 is composed of a thick layer of hydrophobic particles each having platinum deposited thereon. As shown, the vapor-and-water contact and catalyst shelves 3 and 4 are arranged alternately with each other, and two vapor-and-water contact shelves lying above and below each catalyst bed are communicated by an associated overflow pipe 6, extending on the inner wall of the column.

In operation a hydrogen gas containing an isotope of hydrogen for instance deuterium is supplied to the bottom of the column, whereas water is supplied to the top of the column, thus causing the water to flow down from stage to stage via an associated overflow pipe and to contact the rising water vapor at each vapor-and-water contact shelf. When the hydrogen gas passes through each contact shelf, it accompanies water in the form of water vapor. The hydrogen gas-and-steam mixture rises and passes through the hydrophobic catalyst beds one after another. Then, deuterium is transferred from the hydrogen gas to the accompanying steam, and the steam thus enriched with deuterium and carried by the hydrogen gas contacts the water at every vapor-and-water contact shelf, thereby accordingly enriching the water with deuterium. Thus, descending from stage to stage the water is increasingly enriched with deuterium.

With this arrangement the increase of the flow rate of the hydrogen gas is necessary to increase the production rate of heavy water. The rise of superficial velocity of the hydrogen gas, however, will cause the blowing and splashing of the water off from the plates 3 so that the column cannot work. Still disadvantgeously a relatively large amount of pressure loss is caused across each vapor-and-water contact layer. In view of this if the water on the perforated plate 2 is kept at a level low enough to cause a negligible small amount of pressure loss, the vapor-and-water contacting efficiency, and hence deuterium transporting efficiency accordingly decreases. On the other hand with a view to improving the efficiency of hydrogen gas steam isotopic exchange reaction if catalyst particles of small size are used, the catalyst bed becomes stuffy. Then, the water dripping from the overlying perforated plate would flood on the stuffy catalyst bed. For these reasons the increase of the production rate of heavy water is limited.

The object of this invention is to provide a multi-stage hydrogen-water isotopic exchange column whose heavy water production rate is at an increased value against the physical volume of facilities. To attain this object there is provided a multi-stage hydrogen-water isotopic exchange column comprising, at each stage, a vapor-and-water contact shelf through which water passes at such a slow rate that the descending water contacts the rising water vapor for an extended length of time; a hydrophobic catalyst bed for expediting the isotopic exchange reaction between water vapor and hydrogen gas, spaced from and lying under the overlying vapor-and-water contact shelf; and water collecting, transferring and scattering means comprising a receptacle for collecting water dripping from the overlying vapor-and-water contact shelf, a water channel extending through the underlying catalyst bed and a sprinkler for scattering water on the upper-surface of the underlying vapor-and-water contact shelf of the lower adjacent stage.

Referring to FIG. 2, there is shown a first embodiment according to this invention. As shown a multi-stage column 21 comprises, at each stage, a vapor-and-water contact shelf 22 through which water flows downward at such a slow rate that the descending water contacts the rising water vapor for an elongated length of time; a hydrophobic catalyst shelf 23 for expediting the isotopic exchange reaction between steam and hydrogen gas, spaced from and lying under the overlying vapor-and-water contact shelf; and water collecting, transferring and scattering means comprising a receptacle 25 for collecting water dripping from the overlying vapor-and-water contact shelf, a water channel 26 extending through the underlying catalyst bed and a sprinkler 24 for scattering water on the upper-surface of the underlying vapor-and-water contact shelf of the lower adjacent stage.

The hydrophobic catalyst used may contain at least one metal which is selected from the 8th group of the Periodic Table, and is deposited on porous spherical or cylindrical carrier particles (0.1 to 5 mm in diameter) of a hydrophobic or so-treated material, as for instance porous hydrophobic particles each having platinum deposited thereon. The catalyst bed may be constituted by filling a space with such metal-deposited hydrophobic particles or by putting metal-carrying and hydrophobic treated foamed bodies or honey-comb structures in place.

A hydrogen gas containing deuterium is supplied to the bottom of the exchange column, and then the gas rises towards the top of the exchange column. On the other hand, water is sprinkled over the upper surface of the vapor-and-water contact shelf at each stage. A particular embodiment uses in the vapor-and-water contact shelves, "Sulzer Packed Column" (Trade name) which is a fine-netted structure of stainless steel. Any filling material which can be used in a distillation column (Raschig ring, MacMahon Packing, or Dixon Packing) can be equally used. "Sulzer Packed Column", however, is recommendable of all. The water is sprinkled, and it passes through the thickness of the "Sulzer Packed Column" at a slow speed. The hydrogen gas rises from the bottom to the top of the column, and at each stage the gas while passing through the "Sulzer Packed Column" 22' is humidified with steam or vapor of water. The so humidified gas rises and passes through each overlying catalyst bed 23 at the upper adjacent stage. Then, under the influence of the catalyst a part of deuterium transfers from the hydrogen gas to the vapor of water through the isotopic exchange reaction between the water vapor and the hydrogen gas. The steam thus enriched with deuterium leaves the catalyst bed, and rises together with the hydrogen gas. The steam-and-hydrogen gas mixture passes through the perforated cone plate 25 and then it contacts the water slowly descending in the "Sulzer Packed Column" 22. Then, the deuterium-enriched steam contacts countercurrently the descending water, accordingly enriching the water with deuterium. The so deuterium-enriched water finally appears on the under-surface of the "Sulzer Packed Column" 22, and drains off to the converging receptacle 25. The water thus collected flows in the water channel 26 and reaches the water sprinkler 24 extending above and covering the upper-surface of the "Sulzer Packed Column" 22' of the next lower stage. Then, the water is sprinkled over the upper-surface of the underlying vapor-and-water contact bed 22'. The converging receptacle 25 is preferably made of a water repellent porous plate, apertures of which are small enough to prevent water from passing, still allowing gas to pass therethrough. The water sprinkler 24 scatters a shower of water on the whole upper-surface of the "Sulzer Packed Column". The water continuously falls from the apertures of the sprinkler 24, thereby preventing the gas from passing therethrough to the "Sulzer Packed Column" of the next upper stage, and assuring that the humidified hydrogen gas is directed to the overlying catalyst bed. Thus, the water when descending and passing through the stages one after another will be increasingly enriched with deuterium.

The particulars of a 5-stage column according to the first embodiment are:

A hydrophobic catalyst used was styrenedivinylbenzene copolymer particles (0.2 mm in diameter) each carrying 0.5 w% platinum. The hydrophobic catalyst particles are packed 10 mm. thick on each catalyst bed bottom plate. "Sulzer Packed Column" was packed 150 mm. thick on each vapor-and-water contact bed bottom plate. A 9.40 mol% heavy water was supplied to the top of the column whereas a natural hydrogen gas the deuterium content of which is as small as 100 ppm, was supplied to the bottom of the column at the same molar flow rate as the heavy water. The content of deuterium in the hydrogen gas collected at the top of the column was determined, and then the efficiency "$\eta$" of the column was determined by the following equation:

$$\eta = \frac{y_t - y_o}{y_e - y_o} \times 100 \, (\%),$$

where $y_e$ is the deuterium content (mol fraction) of the hydrogen gas at the top of the column which deuterium content is estimated in case where the isotopic exchange at the catalyst bed and the isotopic exchange at the vapor-and-water content bed are both performed at the efficiency of 100%; $y_o$ and $y_t$ are the deuterium contents of the hydrogen gas at the bottom and the top of the column respectively.

Table 1 shows how the column efficiency "$\eta$" varies with the superficial flow rate of the hydrogen gas.

TABLE 1

| Superficial flow rate of hydrogen gas (m/sec) | Pressure loss (mm H$_2$O) | Column efficiency, $\eta$(%) |
|---|---|---|
| 0.1 | 20 | 100 |
| 0.2 | 30 | 100 |
| 0.3 | 50 | 98 |

These experimental data show that the column efficiency is almost independent of the increasing of the flow rate of the hydrogen gas and that the pressure loss remains at a relatively small value.

Referring to FIG. 3, there is shown a second embodiment according to this invention.

Similar to the first embodiment as described above a multi-stage hydrogen-water isotopic exchange column 31 comprises, at each stage, a vapor-and-water contact bed 32 through which water flows downward at such a slow rate that the descending water contacts the rising water vapor for an elongated length of time; a hydrophobic catalyst bed 33 for expediting the isotopic exchange reaction between the steam and the hydrogen gas, spaced from and lying under the overlying vapor-and-water contact bed; and water collecting, transferring and scattering means 35, 36 and 34.

In operation a hydrogen gas which contains deuterium rises from the bottom to the top of the column, whereas water descends in the countercurrent relation with the rising gas, and is repeatedly sprinkled over the upper-surface of each vapor-and-water contact bed 32, 32' which is closely packed with "Sulzer Packed Column", as is the case with the first embodiment.

More specifically, the hydrogen gas while passing through a lower stage "Sulzer Packed Column" is saturated with water vapor, and then the so humidified hydrogen gas passes through the catalyst bed 33, where the isotopic exchange between the steam and the hydrogen gas occures, thereby allowing deuterium to transfer from the hydrogen gas to the steam. Then, the steam thus enriched with deuterium is carried by the hydrogen gas to an overlying "Sulzer Packed Column", where the steam contacts with the descending water for an extended length of time. The water is accordingly enriched with deuterium, and it drips from the under-surface of the "sulzer Packed Column" to a bubble cap plate consisting of a horizontal plate 38 and a plurality of capped pipes 35, which rise from the horizontal plate. Then, the water flows along the horizontal plate 38 and through a vertical water channel 36, and the water reaches a water-distributor 34 which extends over the whole upper-surface of the underlying "Sulzer Packed Column" 32' of the next lower stage. The water is sprinkled over the upper-surface of the "Sulzer Packed Column". Thus, the water descending one stage after another will be increasingly enriched with deuterium.

Some particulars of a 5-stage column according to the second embodiment of this invention are given as follows:

The catalyst bed is composed of a 55 mm-thick layer of porous Teflon particles (3 mm $\phi$) each carrying 0.5 w% platinum. The other factors are similar to those in the first embodiment. The experimental results are shown in Table 2.

TABLE 2

| Superficial flow rate of hydrogen gas (m/sec) | Pressure loss (mm $H_2O$) | Column efficiency, $\eta$ (%) |
| --- | --- | --- |
| 0.1 | 5 | 100 |
| 0.2 | 6 | 100 |
| 0.3 | 8 | 97 |
| 0.4 | 12 | 90 |
| 0.5 | 18 | 87 |
| 0.6 | 25 | 84 |
| 0.8 | 40 | 80 |
| 1.0 | 60 | 75 |

As mentioned earlier, the conventional structure shown in FIG. 1 cannot work when the superficial flow rate of the hydrogen gas is increased above 0.3 m/sec., because the gas would blow off the water upto the overlying catalyst bed 4. The column structure according to this invention is guaranteed free of such malfunction. Also, Table 2 shows that no drastic decrease is found in terms of the column efficiency for the flow rate of hydrogen gas three times as much as the upper-limited value for the conventional structure. This means that the exchange column according to this invention the physical column of which is one third of the conventional column can produce the heavy water at the same production rate as the conventional column and that the construction cost is accordingly reduced. Also, advantageously the pressure drop is so small that the hydrogen gas pumping power is reduced.

The embodiments according to this invention is described as applying them to heavy water facilities, but this should not be understood as limitative. As is obvious to those skilled in the art, the column structure according to this invention can be equally applied to eliminating tritium from heavy or light water.

What is claimed is:

1. A multi-stage hydrogen-water isotopic exchange column having a top and a bottom comprising means for introducing water at the top of the column, means for introducing hydrogen gas containing deuterium at the bottom of the column and further comprising, at each stage, a vapor-and-water contact shelf through which water flows at a slow rate and the descending water contacts rising humidified vapor, a hydrophobic catalyst shelf containing a metal catalyst for expediting the isotopic exchange reaction between the water vapor and hydrogen gas, spaced from and lying under the overlying vapor-and-water contact shelf, and means for receiving the water dripping from the overlying vapor-and-water contact shelf and for guiding the water to a water channel extending through an underlying catalyst shelf and for scattering the water on the upper-surface of the vapor-and-water contact shelf of the next lower stage.

2. A multi-stage exchange column according to claim 1 wherein said means comprises a perforated cone which diverges to and opens at the under-surface of the overlying vapor-and-water contact shelf of the next upper stage, a water distributor extending above and covering the whole upper-surface of the underlying vapor-and-water contact shelf of the lower adjacent stage, and a water channel extending through the catalyst shelf and connecting the perforated cone and the water distributor.

3. A multi-stage exchange column according to claim 1 wherein said means comprises a bubble cap plate lying above the upper-surface of the catalyst shelf; a water-distributor extending above and covering the upper-surface of the vapor-and-water contact shelf of the next lower stage; and a water channel extending through the catalyst shelf and connecting the bubble cap plate and the distributor with each other.

4. A multi-stage exchange column according to claim 1, or claim 2 or claim 3 wherein the vapor-and-water contact shelf is composed of a closely compacted fine network structure.

* * * * *